United States Patent
Takahashi et al.

(10) Patent No.: US 11,856,249 B2
(45) Date of Patent: Dec. 26, 2023

(54) CAUSE-OF-VIEWER-DISENGAGEMENT ESTIMATING APPARATUS, CAUSE-OF-VIEWER-DISENGAGEMENT ESTIMATING METHOD AND PROGRAM

(71) Applicant: NIPPON TELEGRAPH AND TELEPHONE CORPORATION, Tokyo (JP)

(72) Inventors: Shoko Takahashi, Musashino (JP); Kazuhisa Yamagishi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 22 days.

(21) Appl. No.: 17/753,889

(22) PCT Filed: Mar. 31, 2020

(86) PCT No.: PCT/JP2020/014771
§ 371 (c)(1),
(2) Date: Mar. 17, 2022

(87) PCT Pub. No.: WO2021/059566
PCT Pub. Date: Apr. 1, 2021

(65) Prior Publication Data
US 2022/0417573 A1 Dec. 29, 2022

(51) Int. Cl.
*H04N 21/25* (2011.01)
*H04N 21/2662* (2011.01)
*H04N 21/24* (2011.01)
*H04N 21/2543* (2011.01)

(52) U.S. Cl.
CPC ....... *H04N 21/251* (2013.01); *H04N 21/2401* (2013.01); *H04N 21/2408* (2013.01); *H04N 21/2543* (2013.01); *H04N 21/2662* (2013.01)

(58) Field of Classification Search
CPC ............. H04N 21/251; H04N 21/2662; H04N 21/2402; H04N 21/2543; H04N 21/2408
See application file for complete search history.

(56) References Cited

U.S. PATENT DOCUMENTS

| | | | | |
|---|---|---|---|---|
| 9,467,745 | B1* | 10/2016 | Hotchkiss | H04N 21/25 |
| 9,525,641 | B1* | 12/2016 | Greene | H04L 47/30 |
| 11,762,901 | B2* | 9/2023 | Pachet | G06F 16/685 |
| | | | | 715/727 |
| 2011/0125712 | A1* | 5/2011 | Kaila | G06F 16/44 |
| | | | | 707/626 |

(Continued)

OTHER PUBLICATIONS

Hyunwoo Nam et al., "QoE Matters More Than QoS: Why People Stop Watching Cat Videos", IEEE Infocom 2016—The 35th Annual IEEE International Conference on Computer Communications, Apr. 10, 2016.

(Continued)

*Primary Examiner* — Robert J Hance
(74) *Attorney, Agent, or Firm* — IPUSA, PLLC

(57) ABSTRACT

A viewing abandonment factor estimation device includes a memory; and a processor configured to include an estimation model for estimating a factor, the estimation model including a plurality of feature quantities measurable for viewing of a video relevant to an adaptive bit rate video distribution as inputs and the factor of the viewing abandonment in the viewing as an output.

9 Claims, 5 Drawing Sheets

(56) References Cited

U.S. PATENT DOCUMENTS

| | | | | |
|---|---|---|---|---|
| 2013/0174045 A1* | 7/2013 | Sarukkai | ............ | G06Q 30/0255 |
| | | | | 715/744 |
| 2013/0263178 A1* | 10/2013 | Dow | ................ | H04N 21/25866 |
| | | | | 725/32 |
| 2016/0014461 A1* | 1/2016 | Leech | ................ | H04N 21/4668 |
| | | | | 725/14 |
| 2018/0262582 A1* | 9/2018 | Benedetto | ............... | H04L 67/52 |
| 2018/0367847 A1* | 12/2018 | Brinkley | ............ | H04N 21/6473 |
| 2020/0099733 A1* | 3/2020 | Chu | ................... | H04N 21/8456 |
| 2020/0272659 A1* | 8/2020 | Pachet | ................. | H04N 21/854 |
| 2020/0322662 A1* | 10/2020 | Korte | ..................... | G06N 20/00 |
| 2022/0335084 A1* | 10/2022 | Pachet | ................... | G06N 20/00 |

OTHER PUBLICATIONS

Liang Chen et al., "Video Browsing—A Study of User Behavior in Online VoD Services", 22nd International Conference on Computer Communication and Networks (ICCCN), Jul. 30, 2013.

Mamadou Tourad Diallo et al., "Impacts of Video Quality of Experience on User Engagement in a Live Event", 5th International Conference on Multimedia and Expo Workshops(ICMEW), Jul. 14, 2014.

Xiaoru Wang et al., "Characterizing the correlation between video types and user quality of experience in the large-scale internet video service", 2015 12th International Conference on Fuzzy Systems and Knowledge Discovery (FSKD), Aug. 15, 2015.

Shoko Takahashi and Kazuhisa Yamagishi, "Viewing-abandonment-factor Estimation for Adaptive Bitrate Video Streaming", IEICE Technical Report, pp. 19-24, vol. 119, No. 125, 2019.

\* cited by examiner

CAUSE-OF-VIEWER-DISENGAGEMENT ESTIMATING APPARATUS, CAUSE-OF-VIEWER-DISENGAGEMENT ESTIMATING METHOD AND PROGRAM

TECHNICAL FIELD

The present disclosure relates to a viewing abandonment factor estimation device, a viewing abandonment factor estimation method, and a program.

BACKGROUND ART

With the technological development of video coding, distribution, networks, displays, and the like, adaptive bit rate video distribution for mobile terminals is rapidly becoming widespread. In the adaptive bit rate video distribution, a video player dynamically controls a distribution bit rate according to a throughput or buffer use situation to achieve smooth video playback.

On the other hand, in the adaptive bit rate video distribution, coding quality deterioration or playback stop may occur due to an extreme decrease in throughput or buffer exhaustion in a receiving terminal, and business operators are still facing the risk of viewing abandonment of users (ending of viewing during video playback).

Business operators need to prevent viewing abandonment of users by appropriately designing or controlling quality, and for that purpose, it is necessary to model a relationship between quality and viewing abandonment. However, according to investigation results of the 25th Internet Consumer Transaction Liaison Meeting of the Consumer Affairs Agency, content and quality, excluding price, are important when a paid video distribution service is chosen. From this, a likelihood that viewing abandonment includes a mixture of viewing abandonment due to quality and viewing abandonment due to content is considered to be high. Thus, in order to precisely model the relationship between quality and viewing abandonment, it is necessary to perform classification of the mixture of viewing abandonment due to quality and viewing abandonment due to content, and extract the viewing abandonment due to quality as training data of the viewing abandonment model. Thus, a technology for estimating a viewing abandonment factor, that is, classifying the viewing abandonment factor as quality or content, is required.

Related art for clarifying a causal relationship between viewing abandonment and various factors affecting the viewing abandonment include the following.

First, as a technology for clarifying a causal relationship between quality factors and viewing abandonment, NPL 1 shows that a viewing abandonment rate increases exponentially as a playback stop percentage or a bit rate fluctuation percentage increases.

Further, as a technology for clarifying a causal relationship between content factors and viewing abandonment, NPL 2 shows that the less popular content is, the faster the viewing abandonment is, or that a viewing time percentage differs depending on a genre of the content.

Further, as a technology for clarifying a complex causal relationship between quality factors and content factors and viewing abandonment, NPL 3 shows that a viewing time is shortened by 25 minutes when a playback stop time percentage increases by 1% in a popular match, and there is also a positive weak correlation between an average bit rate and a viewing time in the popular match. Further, NPL 4 shows that impacts of playback start waiting, playback stop, or bit rate on a viewing time percentage differ depending on a genre of content.

Citation List

Non Patent Literature

NPL 1: H. Nam, K. Kim, and H. Schulzrinne, "QoE Matters More Than QoS: Why People Stop Watching Cat Videos," in Proc. IEEE International Conference on Computer Communications (INFOCOM), April 2016.

NPL 2: L. Chen, Y. Zhou, and D. M. Chiu, "Video Browsing - A Study of User Behavior in Online VoD Services," in Proc. 22nd International Conference on Computer Communication and Networks (ICCCN), July 2013.

NPL 3: M. T. Diallo, F. Fieau, and J. B. Hennequin, "Impacts of Video Quality of Experience on User Engagement in a Live Event," in Proc. 5th International Conference on Multimedia and Expo Workshops (ICMEW), July 2014.

NPL 4: X. Wang, A. Wei, Y. Yang, and J. Ning, "Characterizing the correlation between video types and user quality of experience in the large-scale internet video service," in Proc. 12th International Conference on Fuzzy Systems and Knowledge Discovery (FSKD), August 2015.

SUMMARY OF THE INVENTION

Technical Problem

Examples of factors that can affect viewing abandonment include content, coding performance, network performance, and terminal performance corresponding to components of adaptive bit rate video distribution. Of these, the coding performance, the network performance, and the terminal performance are considered to affect the viewing abandonment through application quality (playback start waiting, playback stop, coding quality, or the like) that a user actually experiences. Further, in the process of the user abandoning the viewing, it is considered to be some sign appears in application operation behavior (pause, seek, bit rate change, or the like) of a user.

There is some causal relationship between various feature quantities regarding application quality, a user operation, and content, and viewing abandonment factors (for example, a likelihood of viewing abandonment due to quality is high when deterioration of the application quality is significant and the likelihood of viewing abandonment due to content is high when unpopular content is viewed), and it is expected that viewing abandonment factors can be classified based on the various feature quantities, but there is no related art focusing on this causal relationship.

Related art focusing on a causal relationship between various feature quantities regarding the application quality and the content, and a viewing abandonment behavior (viewing abandonment rate, viewing time, or the like) without considering viewing abandonment factors are as listed as NPLs 1 to 4.

However, in NPL 1, although the causal relationship between quality factors and viewing abandonment is analyzed on the premise of viewing abandonment due to quality and a likelihood of actual considerable inclusion of viewing abandonment due to lack of interest in content is high, the impact thereof is not considered.

On the other hand, in NPL 2, the causal relationship between content factors and viewing abandonment is analyzed on the premise of viewing abandonment due to content and a likelihood of considerable inclusion of viewing abandonment due to quality deterioration is high, but the impact thereof is not considered.

In NPLs 3 and 4, the complex causal relationship between quality factors and content factors and viewing abandonment is analyzed, but both are limited to qualitative evaluation and do not quantitatively model the causal relationship.

The present disclosure has been made in view of the above points, and an object of the present disclosure is to make it possible to estimate a viewing abandonment factor in adaptive bit rate video distribution.

Means for Solving the Problem

In order to solve the above problem, a viewing abandonment factor estimation device includes a viewing abandonment factor estimation unit including an estimation model for estimating a factor, and the estimation model includes a plurality of feature quantities measurable for viewing of a video relevant to an adaptive bit rate video distribution as inputs and the factor of the viewing abandonment in the viewing as an output.

Effects of the Invention

It is possible to estimate a viewing abandonment factor in adaptive bit rate video distribution.

DESCRIPTION OF EMBODIMENTS

Figure 1:
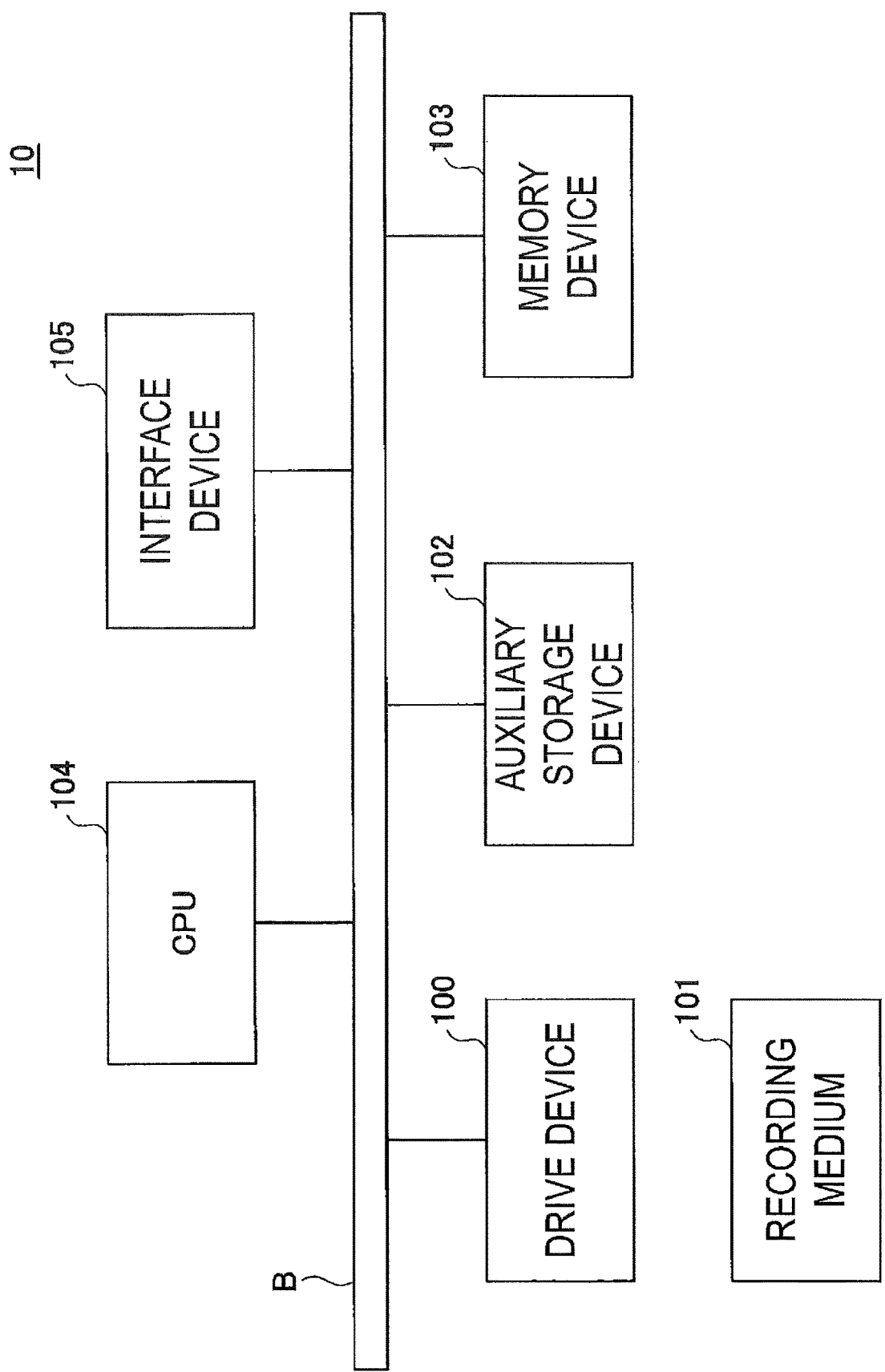
FIG. 1 is a diagram illustrating a hardware configuration example of a viewing abandonment factor estimation device 10 according to an embodiment of the present disclosure.

Hereinafter, an embodiment of the present disclosure will be described with reference to the drawings. FIG. 1 is a diagram illustrating a hardware configuration example of the viewing abandonment factor estimation device 10 according to the embodiment of the present disclosure. The viewing abandonment factor estimation device 10 of FIG. 1 includes a drive device 100, an auxiliary storage device 102, a memory device 103, a CPU 104, an interface device 105, and the like, which are connected to each other by a bus B.

A program for implementing processing in the viewing abandonment factor estimation device 10 is provided by a recording medium 101 such as a CD-ROM. When the recording medium 101 having the program stored therein is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads and stores the program from the auxiliary storage device 102 when the program is instructed to start. The CPU 104 executes functions relevant to the viewing abandonment factor estimation device 10 according to the program stored in the memory device 103. The interface device 105 is used as an interface for connection to a network.

Figure 2:
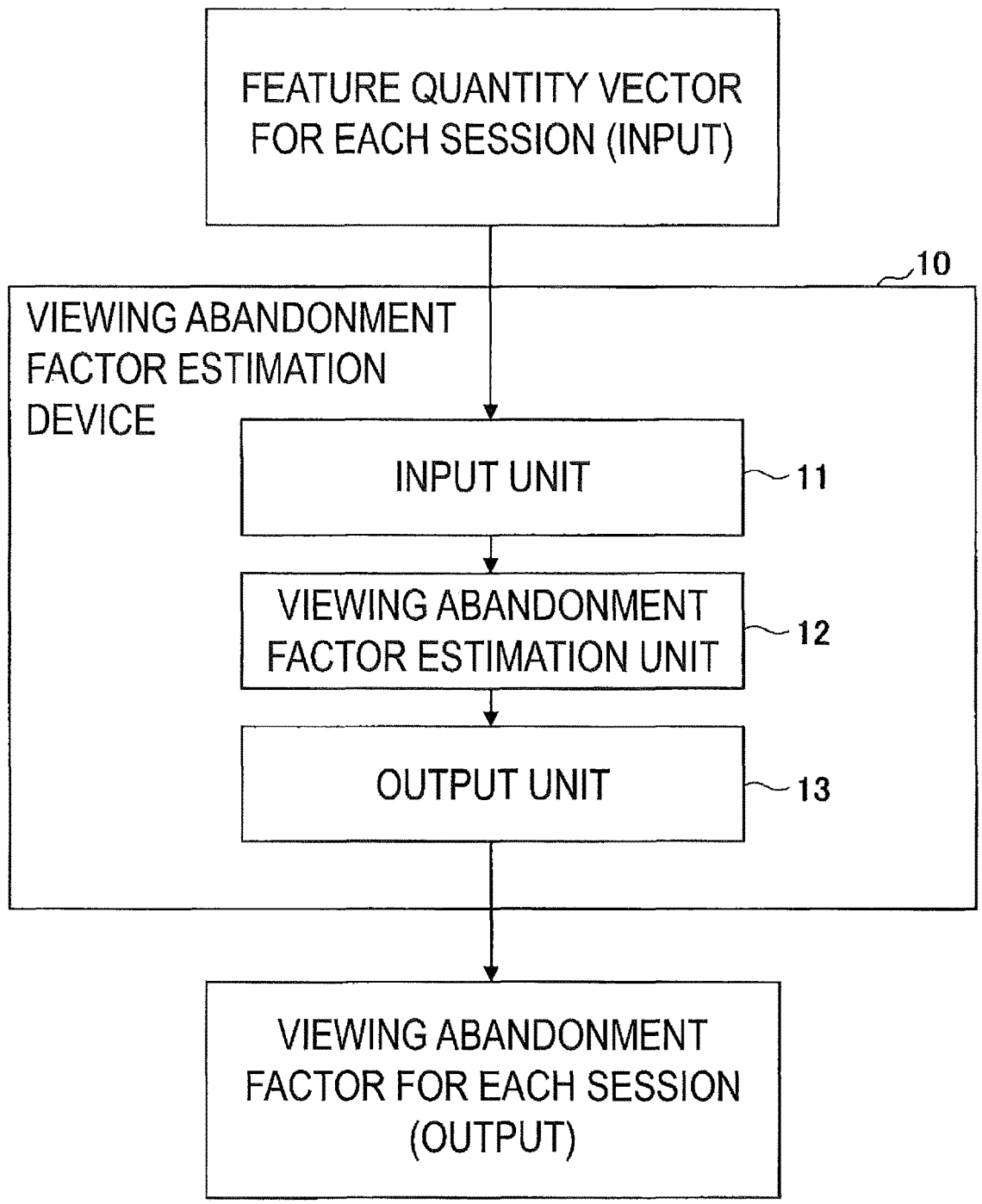
FIG. 2 is a diagram illustrating a functional configuration example of the viewing abandonment factor estimation device 10 according to the embodiment of the present disclosure.

FIG. 2 is a diagram illustrating a functional configuration example of the viewing abandonment factor estimation device 10 according to the embodiment of the present disclosure. As illustrated in FIG. 2, the viewing abandonment factor estimation device 10 includes an input unit 11, a viewing abandonment factor estimation unit 12, and an output unit 13. Each of these units is implemented by processing for causing the CPU 104 to execute one or more programs installed in the viewing abandonment factor estimation device 10.

Figure 3:
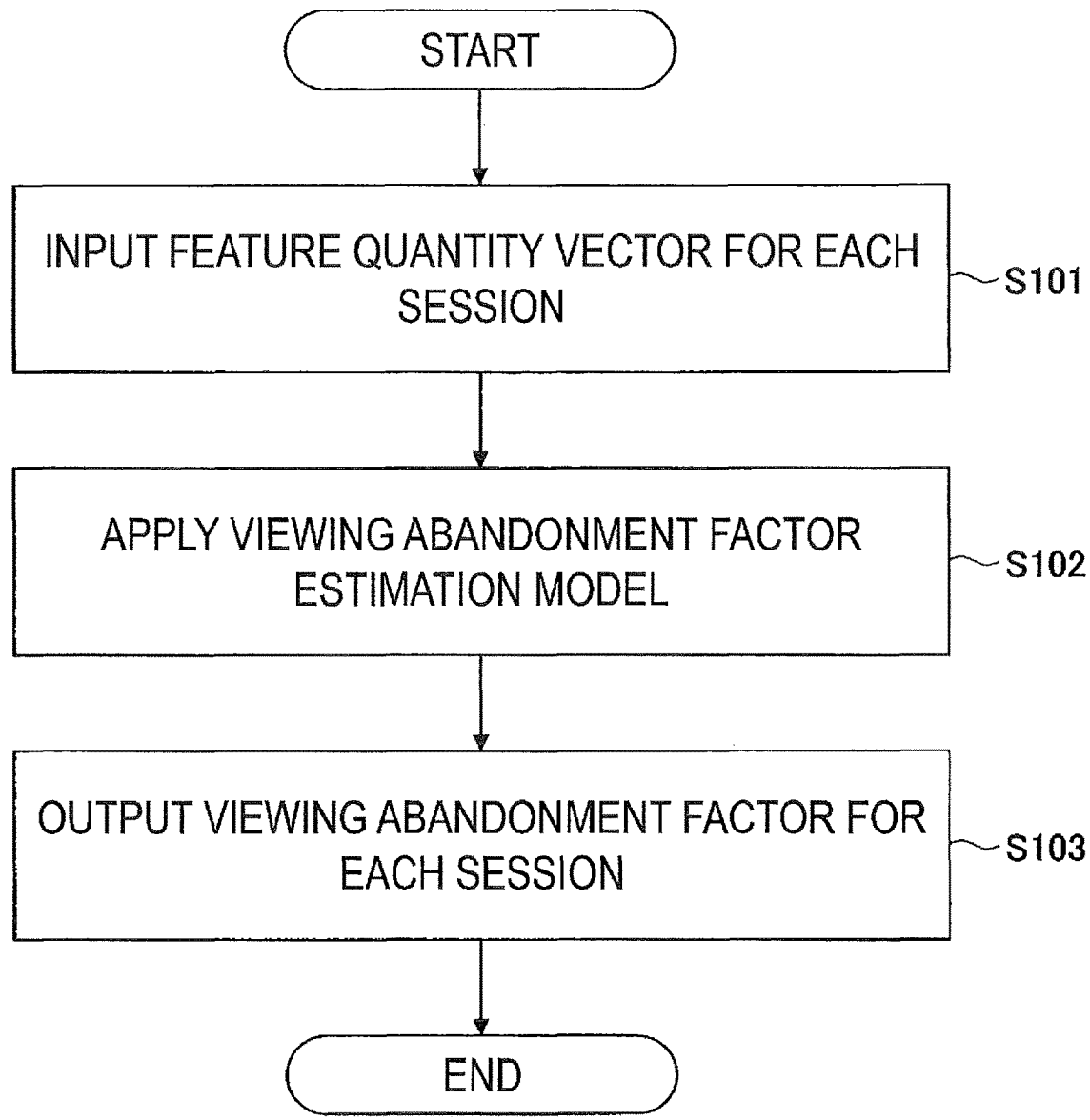
FIG. 3 is a flowchart illustrating an example of a processing procedure that is executed by the viewing abandonment factor estimation device 10.

Hereinafter, a processing procedure that is executed by the viewing abandonment factor estimation device 10 will be described. FIG. 3 is a flowchart illustrating an example of a processing procedure that is executed by the viewing abandonment factor estimation device 10.

In step S101, the input unit 11 inputs a "feature quantity vector for each session" for a session of a viewing abandonment factor estimation target. Here, the session means sequence of events (viewing units) from the start to the end of viewing of a single video by a single user. Pieces of content that are viewing targets in respective sessions may differ.

The "feature quantity vector for each session" is a vector consisting of a plurality of feature quantities measurable during the session for the viewing of the video, and in step S101, a feature quantity vector measured in an actual session is input. In the present embodiment, a vector consisting of application quality measured during the session, a user operation, and a plurality of feature quantities regarding the content is an example of the "feature quantity vector for each session". However, here, a session in which the user has abandoned viewing during video playback is a target, and a session in which the video has been viewed to the end and the playback has ended is not a target.

The application quality is quality that the user actually experiences in an application (a video player) while viewing a video relevant to adaptive bit rate video distribution. Examples of feature quantities regarding the application quality include a playback stop time percentage (a value obtained by normalizing a total playback stop time during the session with a content length), a playback stop count percentage (a value obtained by normalizing the number of times playback is stopped during the session with the content length), an average playback stop interval (an average value of occurrence intervals when a plurality of playback stops have occurred during the session), a playback start waiting time percentage (a value obtained by normalizing a playback start waiting time immediately after session start with the content length), a primary bit rate (a bit rate of a chunk having quality level played back for the longest time during the session), an average bit rate (a value obtained by weight-averaging a bit rate of all chunks played back during the session with a playback time), a bit rate fluctuation count percentage (a value obtained by normalizing the number of playback bit rate fluctuations that have occurred during the session with the content length), an average bit rate fluctuation interval (an average value of occurrence intervals when a plurality of playback bit rate fluctuations have occurred during the session), a bit rate fluctuation cumulative value percentage (a value obtained by accumulating absolute values of differences each time a playback bit rate fluctuation occurs during a session and normalizing a result of accumulation with a content length).

Further, the user operation is an application (video player) operation performed by the user while viewing the video relevant to the adaptive bit rate video distribution. Specific examples may include playback start, pause (stop temporary), seek (fast forward and fast rewind), bit rate change (resolution change), and playback end. Examples of feature quantities regarding the user operation may include a viewing time percentage (a value obtained by normalizing a user viewing time during a session with the content length), a pause count percentage (a value obtained by normalizing the number of times a pause operation occurs during the session with the content length), an average pause interval (an average value of occurrence intervals when a plurality of pause operations have occurred during the session), a seek count percentage (a value obtained by normalizing the number of seek operation occurrences during the session with the content length), an average seek interval (an average value of occurrence intervals when a plurality of seek operations have occurred during the session), a bit rate change count percentage (a value obtained by normalizing the number of times a bit rate change operation is performed by the user during the session with the content length), an average bit rate change interval (an average value of occurrence intervals when a plurality of bit rate change operations are performed by the user during the session), and a bit rate change cumulative value percentage (a value obtained by accumulating absolute values of differences each time a bit rate change operation is performed by the user during the session and normalizing a result of the accumulation with the content length).

Further, the content is the video relevant to the adaptive bit rate video distribution. Examples of feature quantities regarding content may include a dummy variable regarding a genre (for example, a dummy variable having a value of 1 when the content corresponds to a music genre and a value of 0 when the content does not correspond to the music genre), a content length, the number of views (a total number of times the content has been viewed in a fixed period in the past), and an average viewing time percentage (a value obtained by dividing a total viewing time of the content in the fixed period in the past by the number of views).

Subsequently, the viewing abandonment factor estimation unit 12 applies a viewing abandonment factor estimation model to the "feature quantity vector for each session" input by the input unit 11 to estimate the "viewing abandonment factor for each session" (S102). The "viewing abandonment factor for each session" is a binary variable (a category variable) indicating whether a factor of viewing abandonment during video playback by the user is quality or content and, for example, the binary variable indicates a value of 1 when the viewing abandonment factor is estimated to be the quality, and a value of 2 when the factor is estimated to be the content.

In the present embodiment, the viewing abandonment factor estimation unit 12 includes the viewing abandonment factor estimation model (or the viewing abandonment factor estimation unit 12 uses a viewing abandonment factor estimation model). The viewing abandonment factor estimation model is a model in which various feature quantities regarding the application quality, various feature quantities regarding a user operation, and various feature quantities regarding content are inputs, and the viewing abandonment factor (quality or content) is an output, and a statistical model of a type that performs binary classification or a machine learning model of a type that performs binary classification (classification tree, random forest, logistic regression, support vector machine, or the like) can be applied.

The viewing abandonment factor estimation unit 12 may construct (generate) the viewing abandonment factor estimation model based on, for example, various feature quantities regarding the application quality, the user operation, and the content measured during each session, and correct answer data of a viewing abandonment factor (quality or content) measured at the end of each session, among a plurality of sessions generated in a viewing experiment of the adaptive bit rate video distribution. The measurement of the correct answer data may be performed, for example, by listening to a participant of the viewing experiment. Such listening may be performed by input to a viewing terminal by the participant (input indicating a viewing abandonment factor). Further, videos (content) of respective sessions in the viewing experiment may differ.

As the first embodiment, an example of the viewing abandonment factor estimation model included in (or used by) the viewing abandonment factor estimation unit 12 can include a classification tree model. The classification tree model is a set of classification rules having a tree structure. Each classification rule is represented by a condition part consisting of a combination of ranges of values of a plurality of feature quantities measurable during a session, and a conclusion part indicating a viewing abandonment factor in the session.

In the first embodiment, the derivation of the "viewing abandonment factor for each session" by the viewing abandonment factor estimation unit 12 is specifically performed by applying the feature quantity vector relevant to the session to the classification rules having a tree structure of the classification tree model to trace the binary tree, for each session. When a leaf node is reached, the viewing abandonment factor estimation unit 12 determines that the viewing abandonment factor relevant to the session is either quality or content based on the leaf node.

Figure 4:
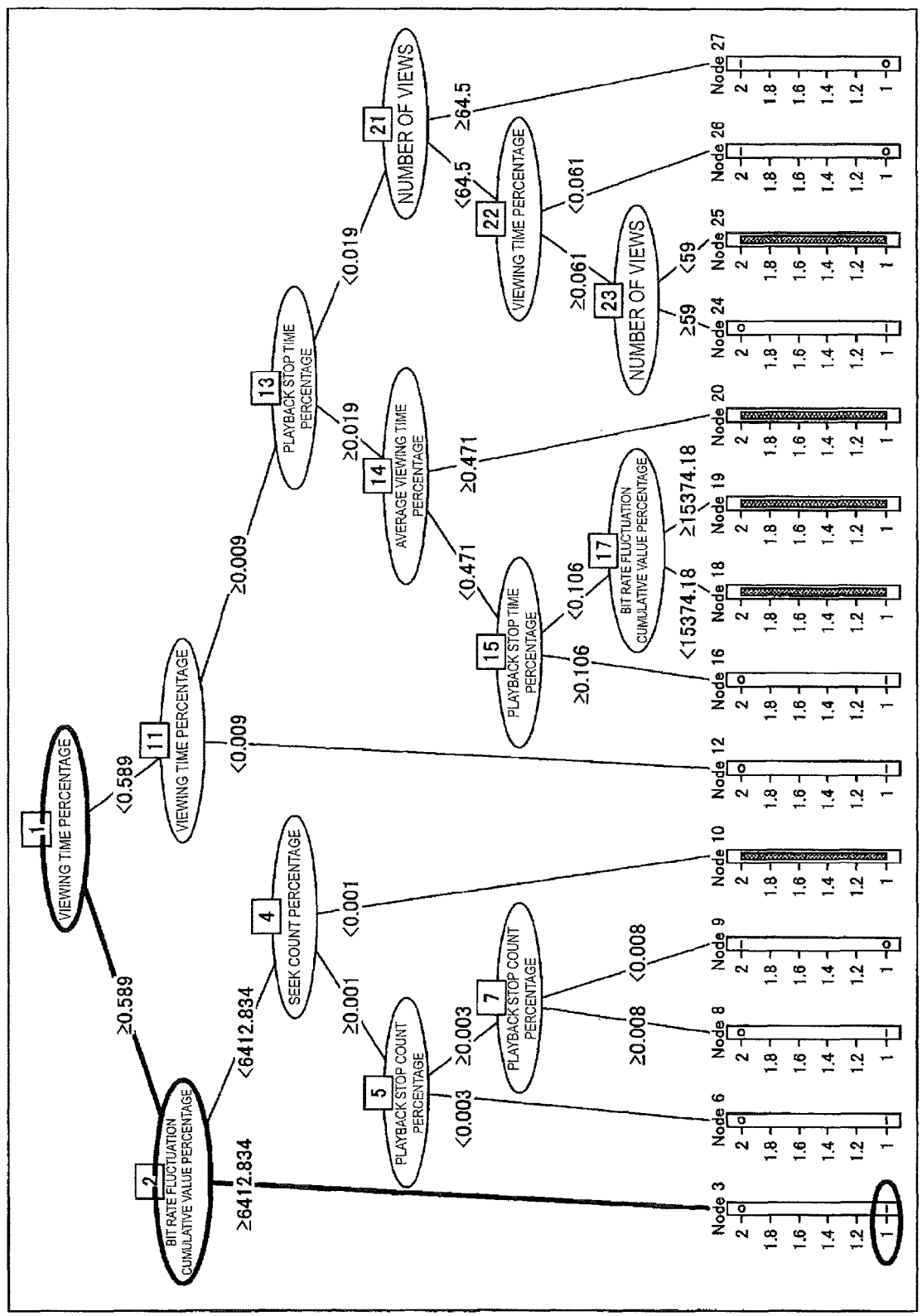
FIG. 4 is a first diagram illustrating an example of classification rules having a tree structure in the first embodiment.

FIG. 4 is a first diagram illustrating an example of the classification rules having a tree structure in the first embodiment. In FIG. 4, for example, classification rules that, when the viewing time percentage is 0.59 or more and the bit rate fluctuation cumulative value percentage is 6413 or more (a condition part), the session is classified as viewing abandonment due to quality (a conclusion part) are shown. This classification rule is a rule that, when viewing of 59% or more of the content length is completed and the bit rate fluctuation cumulative value percentage is about 6500 bps/sec or more, that is, when the bit rate fluctuation cumulative value is about 390 kbps or more in terms of 60 seconds content, the session is determined to be viewing abandonment due to quality.

Figure 5:
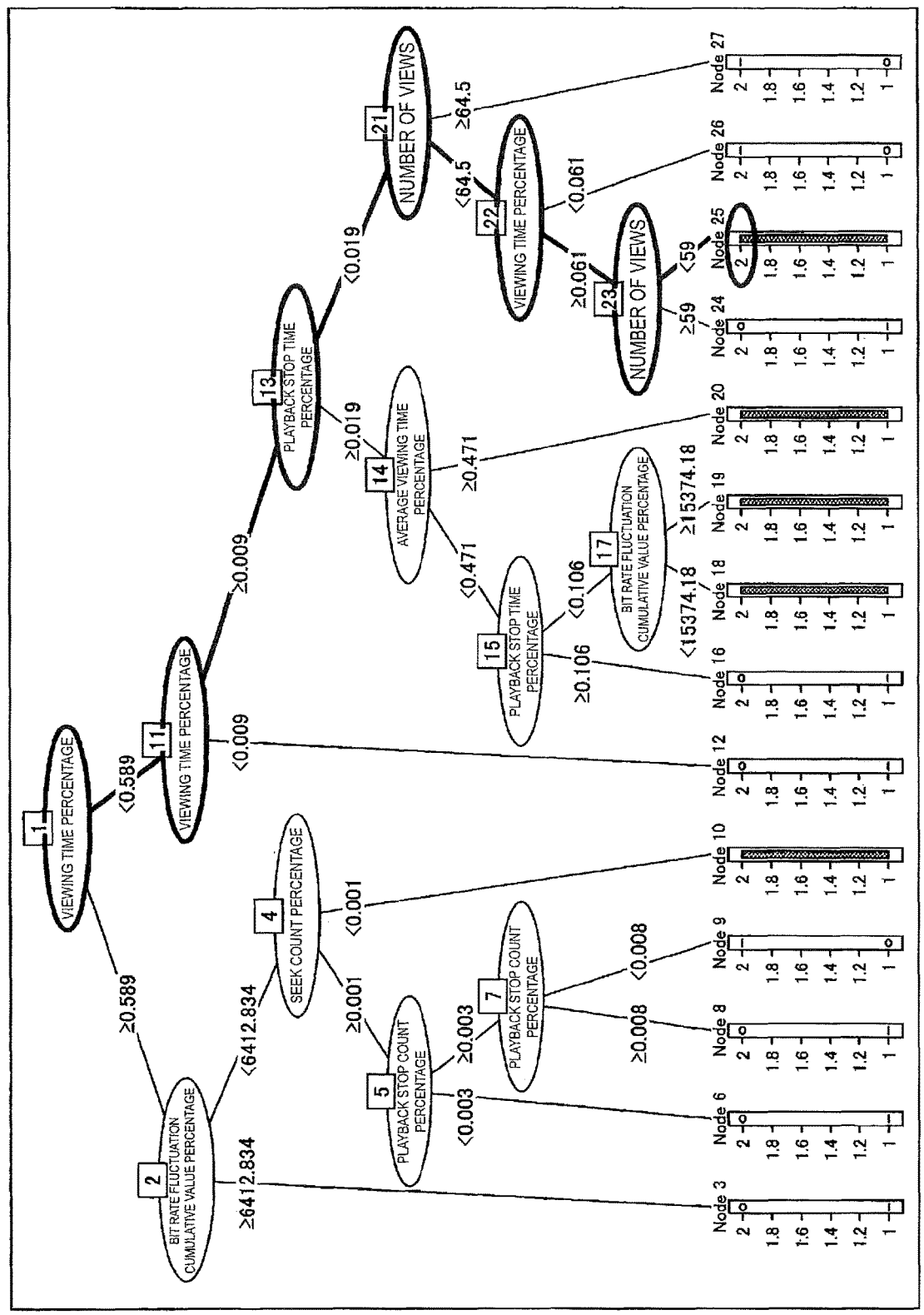
FIG. 5 is a second diagram illustrating an example of classification rules having a tree structure in the first embodiment.

Further, FIG. 5 is a second diagram illustrating an example of the classification rules having a tree structure in the first embodiment. In FIG. 5, for example, a classification rule that, when the viewing time percentage is 0.06 or more and less than 0.59, the playback stop time percentage is less than 0.02, and the number of views is less than 59 (condition part), the session is classified into viewing abandonment due to content (conclusion part) is shown. This classification rule is a rule that, when viewing of 6% or more and less than 59% of the content length is completed, the playback stop time is less than 2% of the content length, and the number of views is less than 59, the session is determined to be viewing abandonment due to content.

Here, a scale corresponding to each of leaf nodes at a bottom of a tree diagram of FIGS. 4 and 5 means that, when an average value in the leaf node (an average value in the session classified into the leaf node) of a binary variable indicating the viewing abandonment factor (a binary variable having a value of 1 when the viewing abandonment factor is the quality and a value of 2 when the viewing abandonment factor is the content) is 1.5 or less (that is, when the number of viewing abandonment sessions due to quality in a session group corresponding to this condition exceeds the number of viewing abandonment sessions due to content), a thick line is drawn on the value 1 (viewing abandonment due to quality) side, and when a new session satisfying this condition is observed, the viewing abandonment factor of the session is determined to be the quality. On the other hand, the scale means that, when the average value of the same viewing abandonment factor is more than 1.5 (that is, when the viewing abandonment due to content exceeds the viewing abandonment due to quality in the session group corresponding to this condition), a thick line is drawn on the value 2 (viewing abandonment due to content) side, and when a new session corresponding to this condition is observed, the viewing abandonment factor of the session is determined to be the content. The leaf node with a gray bar drawn in the scale means that, because the average value of the binary variable indicating the viewing abandonment factor at the leaf node has a value very close to 1.5, it is possible to determine the viewing abandonment factor of the new session corresponding to this condition to be the quality or the content, but the reliability of the determination is rather low. Further, FIGS. 4 and 5 illustrate examples in which the classification rules of the viewing abandonment factor are represented by a tree diagram. However, a representation form of the classification rules is not limited to the tree diagram, and may be a list of a combination of ranges of values of a plurality of feature quantities, such as "an average value of a binary variable indicating a viewing abandonment factor in a session group having the viewing time percentage of 0.59 or more and a bit rate fluctuation cumulative value percentage of 6413 or more being 1.06", and an average value of the binary variable indicating the viewing abandonment factor under the combination.

Subsequently, the output unit 13 outputs the "viewing abandonment factor for each session" estimated by the viewing abandonment factor estimation unit 12 (S103). An output form is not limited to a predetermined one. The "viewing abandonment factor for each session" may be displayed on a display device, may be stored in the auxiliary storage device 102 or the like, or may be transmitted to another computer via a network. The "viewing abandonment factor for each session" may be output in other forms.

As described above, according to the first embodiment, the causal relationship between various feature quantities regarding the application quality, the user operation, and the content, and the viewing abandonment factor is focused on, and, based on a rule that there is a significant difference in the average value of each individual feature quantity between two groups including a viewing abandonment group due to quality and a viewing abandonment group due to content, a plurality of feature quantities regarding the application qualities, the user operation, and the content measurable for viewing of the video relevant to the adaptive bit rate video distribution can be used as inputs, and the viewing abandonment factor in the viewing can be used as an output. Thus, it is possible to estimate whether a factor of viewing abandonment has been quality or content in each session of the adaptive bit rate video distribution. That is, it is possible to estimate the viewing abandonment factor in the adaptive bit rate video distribution.

Thus, it is possible to achieve quality improvement for the viewing abandonment session due to quality, to achieve content expansion for the viewing abandonment session due to content, and to contribute to formulation of appropriate viewing abandonment prevention measures. Further, when a causal relationship between quality factors and viewing abandonment is desired to be clarified, only the viewing abandonment session due to the quality can be extracted and impacts of content factors can be eliminated, and on the other hand, even when a causal relationship between content factors and viewing abandonment is desired to be clarified, only the viewing abandonment session due to the content can be extracted and impacts of the quality factors can be eliminated.

Next, a second embodiment will be described. Difference between the second embodiment and the first embodiment will be described. Points not particularly mentioned in the second embodiment may be the same as those in the first embodiment.

As a second embodiment, a random forest model can be mentioned as the viewing abandonment factor estimation model included in (or used by) the viewing abandonment factor estimation unit 12. The random forest model is a model based on an ensemble learning algorithm that uses a classification tree model as a weak learner, and estimation results of a plurality of classification tree models constituting this model are integrated by a majority rule.

In the second embodiment, the derivation of the "viewing abandonment factor for each session" by the viewing abandonment factor estimation unit 12 is specifically performed by applying the feature quantity vector relevant to the session to a plurality of classification tree models constituting the random forest model and integrating estimation results for the respective classification trees by a majority rule, for each session. For example, the random forest model consists of 100 classification trees, and when the number of classification trees in which a viewing abandonment factor of a certain session is estimated to be quality is 70 and the number of classification trees in which the viewing abandonment factor is estimated to be content is 30, the viewing abandonment factor of the session is estimated to be the quality.

Next, a third embodiment will be described. Differences between the third embodiment and the first embodiment will be described. Points not particularly mentioned in the third embodiment may be the same as those in the first embodiment.

As a third embodiment, a logistic regression model can be mentioned as the viewing abandonment factor estimation model included in (or used by) the viewing abandonment factor estimation unit 12. The logistic regression model is expressed by Equation (1) below.

[Math. 1]

$$p(x_i) = \frac{1}{1 + \exp(-\beta^T x_i)} \quad (1)$$

Here, $x_i$ indicates a vector consisting of feature quantities measurable during session i, $\beta$ indicates a parameter vector corresponding to the feature quantity vector, and $p(x_i)$ indicates a probability of the viewing abandonment factor of the session i having the feature quantity vector $x_i$ being the quality. A probability of the viewing abandonment factor of the session i being content is expressed by $1-p(x_i)$.

In the third embodiment, the derivation of the "viewing abandonment factor for each session" by the viewing abandonment factor estimation unit 12 is specifically performed by substituting the feature quantity vector relevant to the session into Equation (1) for each session. A probability of viewing abandonment during the session due to the quality is obtained as an output of Equation (1), and when the probability exceeds 0.5, the viewing abandonment factor relevant to the session is determined to be the quality, and when the probability does not exceed 0.5, the viewing abandonment factor relevant to the session is determined to be the content.

Next, a fourth embodiment will be described. Differences between the fourth embodiment and the first embodiment will be described. Points not particularly mentioned in the fourth embodiment may be the same as those in the first embodiment.

As the fourth embodiment, a support vector machine model can be mentioned as the viewing abandonment factor estimation model included in (or used by) the viewing abandonment factor estimation unit 12. The support vector machine model is expressed by Equation (2) below.

[Math. 2]

$$y = \text{sign}\left(\sum_{i \in S} \alpha_i^* t_i K(x_i, x) - h^*\right) \quad (2)$$

Here, x indicates a feature quantity vector of an estimation target session, $x_i$ ($i \in S$) indicates a feature quantity vector of the session i ($\in S$) constituting a support vector (a hyperplane consisting of samples closest to an identification plane of abandonment due to quality and abandonment due to content), $K(x_i, x)$ ($i \in S$) is a kernel function of the feature quantity vector x and xi ($i \in S$) (a function indicating an inner product after nonlinear mapping transformation), $t_i$ ($i \in S$) is a correct answer class label corresponding to session i ($\in S$) (a binary variable having a value of 1 when the abandonment factor is the quality and a value of $-1$ when the abandonment factor is the content), $\alpha_i^*$ is an optimal value of a Lagrange multiplier corresponding to the session i ($\in S$), $h^*$ is an optimal value of a threshold value constituting a discriminating function for abandonment due to quality and abandonment due to content, and sign(u) indicates a code function outputting 1 when u>0 and $-1$ when u<0.

In the fourth embodiment, the derivation of the "viewing abandonment factor for each session" by the viewing abandonment factor estimation unit 12 is specifically performed by substituting the feature quantity vector relevant to the session into Equation (2) for each session. When an output of Equation (2) has a value of 1, the viewing abandonment factor relevant to the session is determined to be the quality, and when the output of Equation (2) has a value of $-1$, the viewing abandonment factor is determined to be the content.

Although the embodiments of the present disclosure have been described in detail above, the present disclosure is not limited to such specific embodiments, and various modifications and changes can be made without departing from the gist of the present disclosure described in the aspects.

This application claims priority based on PCT application No. PCT/JP2019/037361, filed on Sep. 24, 2019, and the entire contents of the PCT application of the same date are incorporated herein by reference.

Reference Signs List

10 Viewing abandonment factor estimation device
11 Input unit
12 Viewing abandonment factor estimation unit
13 Output unit
100 Drive device
101 Recording medium
102 Auxiliary storage device
103 Memory device
104 CPU
105 Interface device

The invention claimed is:

1. A viewing abandonment factor estimation device comprising:
   a memory storing program instructions; and
   a processor configured to execute the stored program instructions, wherein the program instructions include an estimation model for estimating a factor, the estimation model including a plurality of feature quantities measurable for viewing of a video relevant to an adaptive bit rate video distribution as inputs and the factor of the viewing abandonment in the viewing as an output,
   wherein the estimation model comprises a classification tree model comprising a set of classification rules having a tree structure, and
   wherein the factor of the viewing abandonment comprises a binary variable that indicates the cause of abandonment for the video.

2. The viewing abandonment factor estimation device according to claim 1, wherein the processor applies the plurality of feature quantities measured in the viewing to the estimation model to estimate the factor.

3. The viewing abandonment factor estimation device according to claim 1, wherein the estimation model is a statistical model of a type that performs binary classification or a machine learning model of a type that performs binary classification.

4. The viewing abandonment factor estimation device according to claim 1, wherein the cause of abandonment for the video comprises a quality of the video or a content of the video.

5. The viewing abandonment factor estimation device according to claim 1, wherein estimating the factor comprises the estimation model evaluating whether each of the plurality of feature quantities satisfies a threshold for each of the plurality of feature quantities.

6. A viewing abandonment factor estimation method executed by a computer including a memory and processor, the method comprising:
   estimating a factor by an estimation model, the estimation model being stored on the memory and executed by the processor, the estimation model including a plurality of feature quantities measurable for viewing of a video relevant to an adaptive bit rate video distribution as inputs and the factor of the viewing abandonment in the viewing as an output,
   wherein the estimation model comprises a classification tree model comprising a set of classification rules having a tree structure, and
   wherein the factor of the viewing abandonment comprises a binary variable that indicates the primary cause of abandonment for the video.

7. The viewing abandonment factor estimation method according to claim 6, wherein the including includes applying the plurality of feature quantities measured in the viewing to the estimation model to estimate the factor.

8. The viewing abandonment factor estimation method according to claim 6, wherein the estimation model is a statistical model of a type that performs binary classification or a machine learning model of a type that performs binary classification.

9. A non-transitory computer-readable recording medium having computer-readable instructions stored thereon, which when executed, cause a computer including a memory and a processor to operate as the viewing abandonment factor estimation device according to claim 1.

\* \* \* \* \*